(No Model.)
J. A. ROBISON.
THILL COUPLING.
No. 317,207. Patented May 5, 1885.
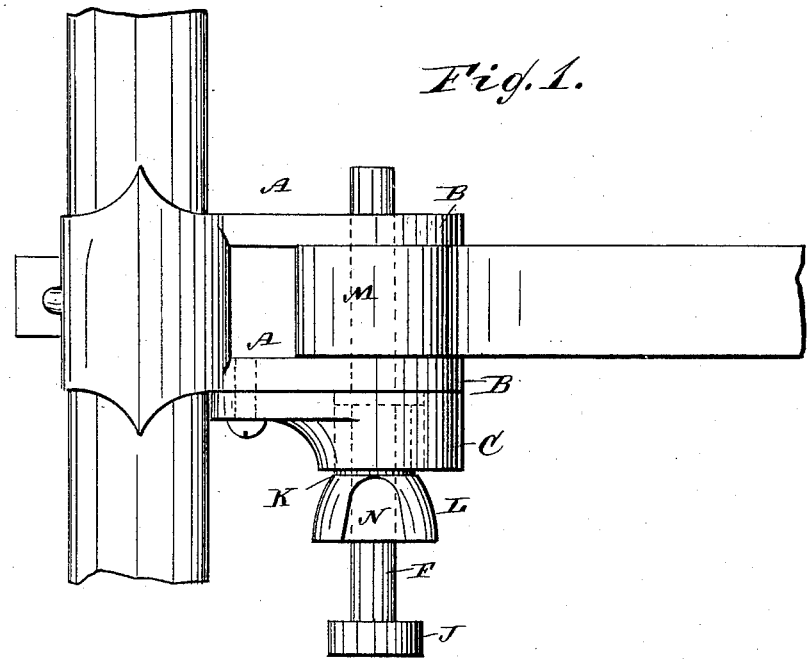
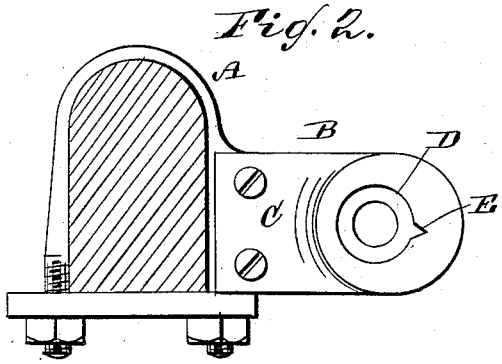
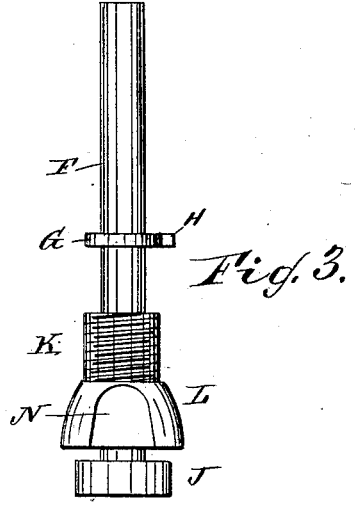
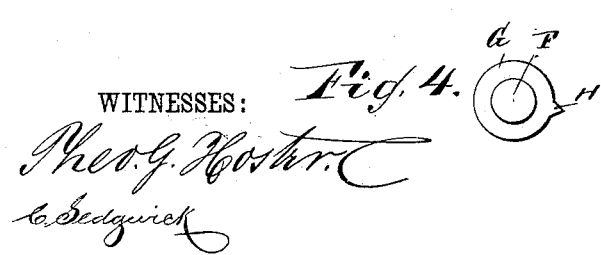
WITNESSES:
Theo. G. Hoster
C. Sedgwick
INVENTOR:
J. A. Robison
BY Munn & Co
ATTORNEYS.

United States Patent Office.

JOSEPH A. ROBISON, OF EVEREST, KANSAS.

THILL-COUPLING.

SPECIFICATION forming part of Letters Patent No. 317,207, dated May 5, 1885.

Application filed February 7, 1885. (No model.)

*To all whom it may concern:*

Be it known that I, JOSEPH A. ROBISON, of Everest, Brown county, Kansas, have invented a new and Improved Thill-Coupling, of which the following is a full, clear, and exact description.

The object of my invention is to provide a new and improved thill-coupling which is simple in construction, strong and durable, and which cannot work loose, and in which the bolt is prevented from turning.

The invention consists in the combination, with an axle-clip having a screw-threaded aperture, of a bolt having a loosely-mounted tubular nut.

The invention also consists in parts and details and combinations of the same, as will be fully set forth hereinafter.

Reference is to be had to the accompanying drawings, forming part of this specification, in which similar letters of reference indicate corresponding parts in all the figures.

Figure 1 is plan view of my improved thill-coupling. Fig. 2 is a side view of the axle-clip and the plate on the same, and a cross-sectional view of the axle. Fig. 3 is a longitudinal view of the bolt, and Fig. 4 is a side view of the collar on the bolt.

The axle-clip A is of the usual construction, and provided with the two lugs or jaws B, on the outer side of one of which a plate, C, is secured, provided with a screw-threaded aperture, D, coinciding with the apertures of the lugs or jaws B.

A groove, E, is cut in the side of the aperture D, and extends from the outer to the inner end of the aperture.

The bolt F is provided at or near its middle with a collar, G, from which a tooth, H, projects, which can be passed through the groove E.

The bolt F has a head, J, and between the head J and the collar G a tubular nut, K, is loosely mounted on the bolt, the said nut being adapted to be screwed into the aperture D.

The nut K has a head, L, provided with recesses N, for inserting the fingers to turn the nut.

The eyes M on the ends of the thills are passed in between the jaws B of the clips A, and a bolt, F, is passed through each aperture D, the apertures in the jaws, and an eye, M, the tooth H passing into the groove E, and thus preventing the bolt from turning. The nut K is then screwed into the aperture D to lock the bolt in place, the inner end of the nut resting against the collar G. As the bolt cannot turn, it cannot loosen the nut.

The nut K can easily be turned without requiring the use of a wrench or key.

The thills can be fastened or unfastened very easily and rapidly, and the bolt cannot drop out or rattle.

The herein-described bolt can be used in all kinds of agricultural and other machines.

The nut L is placed on the bolt prior to forming the head J thereon.

Having thus described my invention, I claim as new and desire to secure by Letters Patent—

1. The combination, with an axle-clip provided with a screw-threaded aperture, of a bolt having a collar, and a tubular nut mounted loosely on the bolt, substantially as herein shown and described.

2. The combination, with an axle-clip provided with a screw-threaded aperture having a longitudinal groove, of a bolt having a collar provided with a tooth, and of a tubular nut loosely mounted on the bolt, substantially as herein shown and described.

3. The combination, with an axle-clip having a screw-threaded aperture, of the bolt F, having a collar, and of the tubular nut K, mounted loosely on the bolt, and having a head, L, provided with a recess, N, substantially as herein shown and described.

JOSEPH A. ROBISON.

Witnesses:
H. L. CLEVENGER,
P. J. CLEVENGER.